(12) United States Patent
Okada et al.

(10) Patent No.: US 6,791,599 B1
(45) Date of Patent: Sep. 14, 2004

(54) APPARATUS FOR DRIVING LIQUID CRYSTAL SHUTTER GLASSES AND SPATIAL TRANSMISSION SIGNAL TRANSMITTING APPARATUS FOR LIQUID CRYSTAL SHUTTER GLASSES

(75) Inventors: Seiji Okada, Moriguchi (JP); Yukio Mori, Kadoma (JP); Haruhiko Murata, Takatsuki (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/154,277

(22) Filed: Sep. 16, 1998

(30) Foreign Application Priority Data

Sep. 19, 1997 (JP) .............................................. 9-254944
Sep. 19, 1997 (JP) .............................................. 9-254945

(51) Int. Cl.[7] ........................ H04N 13/00; H04N 13/04; H04N 15/00
(52) U.S. Cl. ............................. 348/56; 348/57; 359/464
(58) Field of Search ............................... 348/49–58, 42, 348/744, 750, 756, 802; 345/8–10, 96, 31–35; 382/154; 359/462, 463, 464, 465, 466; 250/202, 205, 214 RC, 214 B; 351/200, 209; 342/176, 180; H04N 13/00, 13/04, 15/00

(56) References Cited

U.S. PATENT DOCUMENTS

| | | | |
|---|---|---|---|
| 5,248,880 A | * | 9/1993 | Ferganson ................. 250/205 |
| 5,489,950 A | * | 2/1996 | Masuda ...................... 348/744 |
| 5,621,424 A | * | 4/1997 | Shimada et al. ................ 345/8 |
| 5,717,412 A | * | 2/1998 | Edwards ......................... 345/7 |
| 5,861,936 A | * | 1/1999 | Sorensen ..................... 351/200 |
| 5,917,539 A | * | 6/1999 | Sorensen et al. ............. 348/56 |
| 6,175,350 B1 | * | 1/2001 | Green .......................... 345/96 |
| 6,215,590 B1 | * | 4/2001 | Okano ......................... 359/464 |
| 6,252,624 B1 | * | 6/2001 | Yuasa et al. .................. 348/56 |
| 6,259,426 B1 | * | 7/2001 | Harada et al. .............. 345/112 |

* cited by examiner

Primary Examiner—Gims Philippe
Assistant Examiner—Tung Vo
(74) Attorney, Agent, or Firm—ArentFox PLLC

(57) ABSTRACT

An infrared ray receiving module receives an infrared signal (transmitted by an image display device) generated on the basis of a signal representing switching between right and left eye images. An input signal type automatic judging unit and a field frequency detecting and L/R distinguishing unit acquire data relating to shutter timing of a left eye liquid crystal and a right eye liquid crystal in liquid crystal shutter glasses from the received infrared signal. An operation field frequency determining unit generates decision data relating to shutter timing to be fed to the liquid crystal shutter glasses on the basis of predetermined conditions from the data relating to shutter timing newly obtained in succession, and holds the generated decision data. A liquid crystal driving pulse generating unit can cause the liquid crystal shutter glasses to perform a shutter operation using the held decision data when no decision data is generated because the predetermined conditions are not satisfied. Consequently, it is possible to maintain the shutter operation even if the infrared signal is blocked.

2 Claims, 15 Drawing Sheets

2D

L : T2<(T1+T3)
R : T2=(T1+T3)
2D : T2>(T1+T3)

APPARATUS FOR DRIVING LIQUID CRYSTAL SHUTTER GLASSES AND SPATIAL TRANSMISSION SIGNAL TRANSMITTING APPARATUS FOR LIQUID CRYSTAL SHUTTER GLASSES

BACKGROUND OF THE INVENTION

1. Field of the Invention

It is well known that a 3D (three-dimensional) image display system causes the viewer to view a stereoscopic view by displaying a right eye image and a left eye image alternately on a screen of a 3D display in a predetermined period and comprising liquid crystal shutter glasses, mounted by a viewer, in which a right eye liquid crystal and a left eye liquid crystal alternately transmit light and do not transmit light, respectively, in synchronization with the predetermined period. The present invention relates to a driving apparatus for driving the liquid crystal shutter glasses. The present invention further relates to a spatial transmission signal transmitting apparatus for transmitting a spatial transmission signal fed to the liquid crystal shutter glasses.

2. Description of the Prior Art

In order to inform liquid crystal shutter glasses of switching between a right eye image (R) and a left eye image (L) on the side of a 3D display, there is a technique using an infrared signal. As the specific construction, construction shown in FIG. 16 has been considered. In the construction, a clock having a frequency of 455 to 500 KHz is changed into a clock having a frequency of approximately 30 to 57 KHz by a divider 501, and the clock having a frequency of 30 to 57 KHz is used as a carrier. A gate signal generating circuit 502 receives the clock which is the carrier, and detects an edge of a signal representing switching between a left eye image and a right eye image which are alternately displayed on a screen (hereinafter referred to as an L/R polarity switching signal) by the clock, to generate a signal representing distinction between a right eye image and a left eye image (hereinafter referred to as a gate signal) on the basis of the edge. An AND element 503 carries out the conjunction between the clock which is the carrier and the gate signal, to generate an LED driving pulse. The LED driving pulse is fed to an LED light emitting unit (not shown), so that the LED light emitting unit emits light (blinks) depending on the driving pulse.

In the above-mentioned construction, however, a difference (jitter t) between the edge of the L/R polarity switching signal and a rise edge of the gate signal is a maximum of one pulse of clock having a frequency of 30 to 57 KHz (approximately 20 µs) which is the carrier. The jitter is relatively large. When a signal having the jitter is reproduced (decoded) on the side of the liquid crystal shutter glasses, jitter based on a clock on the side of the liquid crystal shutter glasses is further added. Consequently, the width of the total jitter becomes larger, so that various problems arise. For example, a shutter switching portion flickers.

In cases such as that a person passes between the 3D display and the viewer, the infrared signal may, in some cases, be blocked for several seconds. In such a case, the liquid crystal shutter glasses stop operating in a state where they transmit the right eye image (R) or a state where they transmit the left eye image (L), resulting in a state where 3D view is impossible. The conventional liquid crystal shutter glasses cannot cope with plurality of frequencies. For example, they cope with, if the timing of switching (field frequency) between the right eye image (R) and the left eye image (L) is 120 Hz, only the frequency of 120 Hz, and they cope with, if it is 60 Hz, only the frequency of 60 Hz. That is, they cannot cope with various types of 3D displays that differ in field frequency.

In the liquid crystal shutter glasses, a liquid crystal which does not transmit light when a predetermined minus voltage and a predetermined plus voltage are applied thereto, while transmitting light when a voltage of zero volt is applied has been conventionally used. Since the response speed thereof in a case where the liquid crystal is changed from a state where it does not transmit light to a state where it transmits light upon application of a voltage of zero volt is low, however, the liquid crystal does not sufficiently transmit light even after a vertical blanking period, as shown in FIG. 18, so that the upper part of a screen looks dark.

SUMMARY OF THE INVENTION

The present invention has been made in view of the above-mentioned circumstances and has for its object to provide an apparatus for driving liquid crystal shutter glasses capable of maintaining a shutter operation even if a signal representing shutter timing in the liquid crystal shutter glasses is blocked, to cope with various types of 3D displays which differ in field frequency, and to prevent the upper part of a screen from looking dark.

An apparatus for driving liquid crystal shutter glasses according to the present invention is characterized by comprising receiving means for receiving a spatial transmission signal generated on the basis of a signal representing switching between right and left eye images, means for acquiring data relating to shutter timing in the liquid crystal shutter glasses from the received spatial transmission signal, and means for causing the liquid crystal shutter glasses to perform a shutter operation using the acquired data relating to shutter timing.

According to the above-mentioned construction, the spatial transmission signal is generated on the basis of the signal representing switching between right and left eye. images, and the data relating to shutter timing in the liquid crystal shutter glasses is acquired from the spatial transmission signal on the side of the liquid crystal shutter glasses, to cause the liquid crystal shutter glasses to perform the shutter operation. That is, if a frequency for switching between right and left eye images changes, the spatial transmission signal changes depending on the change, so that the change can be detected on the side of the liquid crystal shutter glasses. Accordingly, the liquid crystal shutter glasses can cope with various types of 3D displays that differ in field frequency.

An apparatus for driving liquid crystal shutter glasses according to the present invention is characterized by comprising receiving means for receiving a spatial transmission signal generated on the basis of a signal representing switching between right and left eye images, means for acquiring data relating to shutter timing in the liquid crystal shutter glasses from the received spatial transmission signal, means for holding the acquired data relating to shutter timing, and means capable of causing the liquid crystal shutter glasses to perform a shutter operation using the held data relating to shutter timing under predetermined conditions.

According to the above-mentioned construction, the spatial transmission signal is blocked, so that the shutter operation in the liquid crystal shutter glasses can be continued (self-contained) even if the data relating to shutter timing in the liquid crystal shutter glasses cannot be generated, thereby making it possible to prevent a screen from flickering when the signal is blocked.

An apparatus for driving liquid crystal shutter glasses according to the present invention is characterized by comprising receiving means for receiving a spatial transmission signal generated on the basis of a signal representing switching between right and left eye images, means for acquiring data relating to shutter timing in the liquid crystal shutter glasses from the received spatial transmission signal, means for generating decision data relating to shutter timing to be fed to the liquid crystal shutter glasses on the basis of predetermined conditions from the data relating to shutter timing newly obtained in succession and holding the generated decision data, and means capable of causing, when no decision data is generated because the predetermined conditions are not satisfied, the liquid crystal shutter glasses to perform a shutter operation using the held decision data.

In the above-mentioned construction, the apparatus for driving liquid crystal shutter glasses may be so constructed that predetermined processing is executed, respectively, in a state where the field frequency is indefinite, a state where the field frequency is definite, and a state where the field frequency is maintained, and the transition from each of the three states to other states occurs depending on the result of the execution, the state where the field frequency is indefinite is a state where the shutter operation is stopped, in which processing for judging whether or not the predetermined conditions are satisfied and generating the decision data when the conditions are satisfied is performed, the state where the field frequency is definite is a state where the shutter operation is performed on the basis of the decision data successively determined, in which the decision data is generated and held when the predetermined conditions are satisfied, while the transition to the state where the field frequency is maintained occurs when the predetermined conditions are not satisfied, and the state where the field frequency is maintained is a state where the shutter operation is continued on the basis of the held decision data, in which the transition to the state where the field frequency is definite occurs when the predetermined conditions are satisfied, while the transition to the state where the field frequency is indefinite occurs when the shutter operation is continued for a predetermined time period without satisfying the predetermined conditions.

In such construction, if the shutter timing obtained from the spatial transmission signal satisfies the predetermined conditions, the state where the field frequency is definite occurs, so that the shutter operation is performed on the basis of the decision data successively determined. When the signal is blocked from any cause in such a state, the transition to the state where the field frequency is maintained occurs. If the shutter timing satisfies the predetermined conditions in this state, the transition to the state where the field frequency is definite occurs. On the other hand, when the shutter timing does not satisfy the predetermined conditions (the conditions are not satisfied if a state where the signal is blocked continues), the shutter operation is continued on the basis of the held decision data. During this period, the transition to the state where the field frequency is definite occurs when the shutter timing satisfies the predetermined conditions, while the transition to the state where the field frequency is indefinite occurs when such a state where the shutter operation is continued continues for a predetermined time period, so that the shutter operation in the liquid crystal shutter glasses is stopped.

An apparatus for driving liquid crystal shutter glasses according to the present invention is an apparatus for driving liquid crystal shutter glasses using a liquid crystal which does not transmit light when a predetermined minus voltage and a predetermined plus voltage are applied, while transmitting light when a voltage of zero volt is applied, characterized by comprising receiving means for receiving a spatial transmission signal generated on the basis of a signal representing switching between right and left eye images, means for acquiring data relating to shutter timing in the liquid crystal shutter glasses from the received spatial transmission signal, and means for causing the liquid crystal shutter glasses to perform a shutter operation by advancing the timing at which a voltage of zero volt is applied by a time period previously set in consideration of a time period required for the liquid crystal to sufficiently transmit light while using the acquired data relating to shutter timing.

In the above-mentioned construction, when a voltage of zero volt is applied (the liquid crystal is brought into a state where it transmits light), the timing is advanced. Even if the response speed in a case where the liquid crystal enters the state where it transmits light is low, therefore, the liquid crystal can sufficiently transmit light before a vertical blanking period is terminated, thereby making it possible to prevent the upper part of a screen from looking dark.

An object of the present invention is to provide a spatial transmission signal transmitting apparatus for liquid crystal shutter glasses that can reduce jitter.

In order to solve the above-mentioned problem, a spatial transmission signal transmitting apparatus for liquid crystal shutter glasses according to the present invention is a spatial transmission signal transmitting apparatus for liquid crystal shutter glasses for transmitting a spatial transmission signal fed to the liquid crystal shutter glasses on the basis of a signal representing switching between a left eye image and a right eye image which are alternately displayed on a screen, characterized by comprising spatial transmission signal generating means driven by a driving pulse, driving pulse generating means for generating the driving pulse by modulating a clock having a first frequency using a signal representing distinction between a right eye image and a left eye image, edge detecting means receiving a clock having a second frequency higher than the first frequency for detecting an edge of the signal representing switching by the clock, means for counting the clock having the second frequency on the basis of the detected edge, and means for generating the signal representing distinction between a right eye image and a left eye image on the basis of the value of counted clocks.

According to the above-mentioned construction, the signal representing distinction between a right eye image and a left eye image is generated on the basis of the clock having the second frequency higher than the first frequency, so that jitter is made smaller, as compared with that in such construction that the signal representing distinction between a right eye image and a left eye image is generated on the basis of the clock having the first frequency (corresponding to construction shown in FIG. 16).

In the above-mentioned construction, the spatial transmission signal transmitting apparatus comprises means for converting the clock having the second frequency into the clock having the first frequency, so that the whole of the apparatus, including the means, may be integrated.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS (Embodiment 1)

Figure 1:
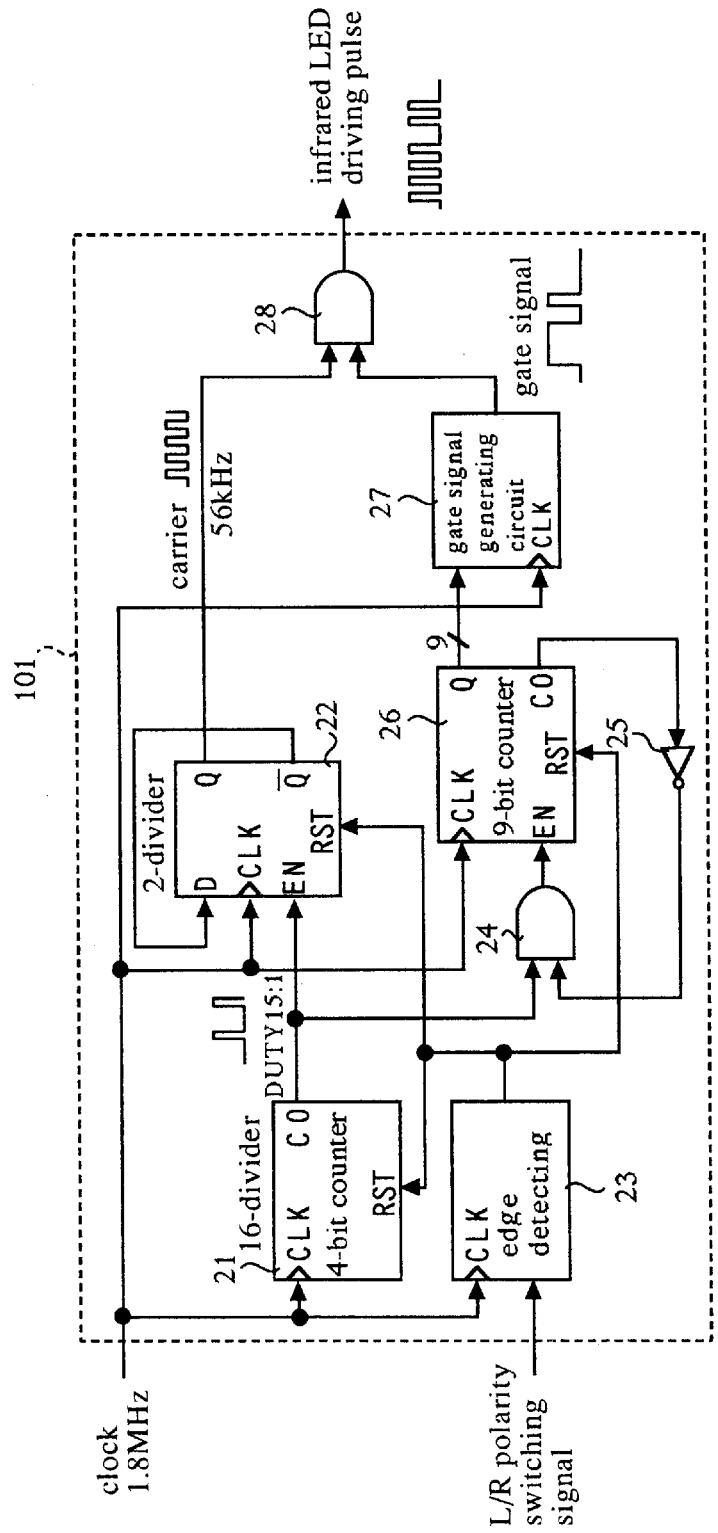
FIG. 1 is a circuit diagram showing an infrared LED driving pulse generating unit in a spatial transmission signal transmitting apparatus (an infrared signal transmitting apparatus) for liquid crystal shutter glasses according to an embodiment 1 of the present invention.

As shown in FIG. 1, a 4-bit counter 21 receives a clock having a frequency of 1.8 MHz from a clock generating unit (not shown) at its clock (CLK) terminal, and outputs one pulse from its carry-out (CO) terminal every time 16 pulses in the clock are inputted. That is, the clock having a frequency of 1.8 MHz is divided by 16. The 4-bit counter 21 is reset when it receives a High signal at its reset (RST) input terminal.

A 2-divider 22 receives a carry-out (CO) signal from the 4-bit counter 21 at its enable (EN) terminal, receives the above-mentioned clock having a frequency of 1.8 MHz at its clock (CLK) terminal, and receives a signal from its $\overline{Q}$ output terminal at its data (D) terminal. The 2-divider 22 alternately outputs a High signal and a Low signal from its Q output terminal every time a pulse in the carry-out (CO) signal is inputted. The outputted signal has a frequency of 56 KHz, and is used as a carrier (a sub-carrier). The 2-divider 22 is reset when it receives a High signal at its reset (RST) input terminal.

An edge detecting unit 23 receives the clock having a frequency of 1.8 MHz at its clock (CLK) terminal, and receives an L/R polarity switching signal corresponding to L/R image signals (a signal representing switching between right and left eye images). The L/R polarity switching signal is a signal for alternately forming High and Low for each predetermined time period, as shown in FIG. 2(a), and indicates that High is a state where a right eye image is displayed and Low is a state where a left eye image is displayed, for example.

The edge detecting unit 23 outputs a reset signal (High) when the first pulse in the clock having a frequency of 1.8 MHz is inputted in a case where the L/R polarity switching signal is High. The reset signal is fed to the 4-bit counter 21, the 2-divider 22, and a 9-bit counter 26 as described later.

The 9-bit counter 26 receives a value obtained by carrying out in an AND element 24 the conjunction between a value obtained by inverting a carry-out (CO) signal from itself by an inverter 25 and a value obtained by dividing the clock having a frequency of 1.8 MHz by 16 at its enable (EN) terminal. The 9-bit counter 26 further receives the clock having a frequency of 1.8 MHz at its clock (CLK) terminal, and outputs a counter value (a 9-bit signal) corresponding to the value obtained by dividing the clock having a frequency of 1.8 MHz by 16 from its Q terminal.

Figure 2:
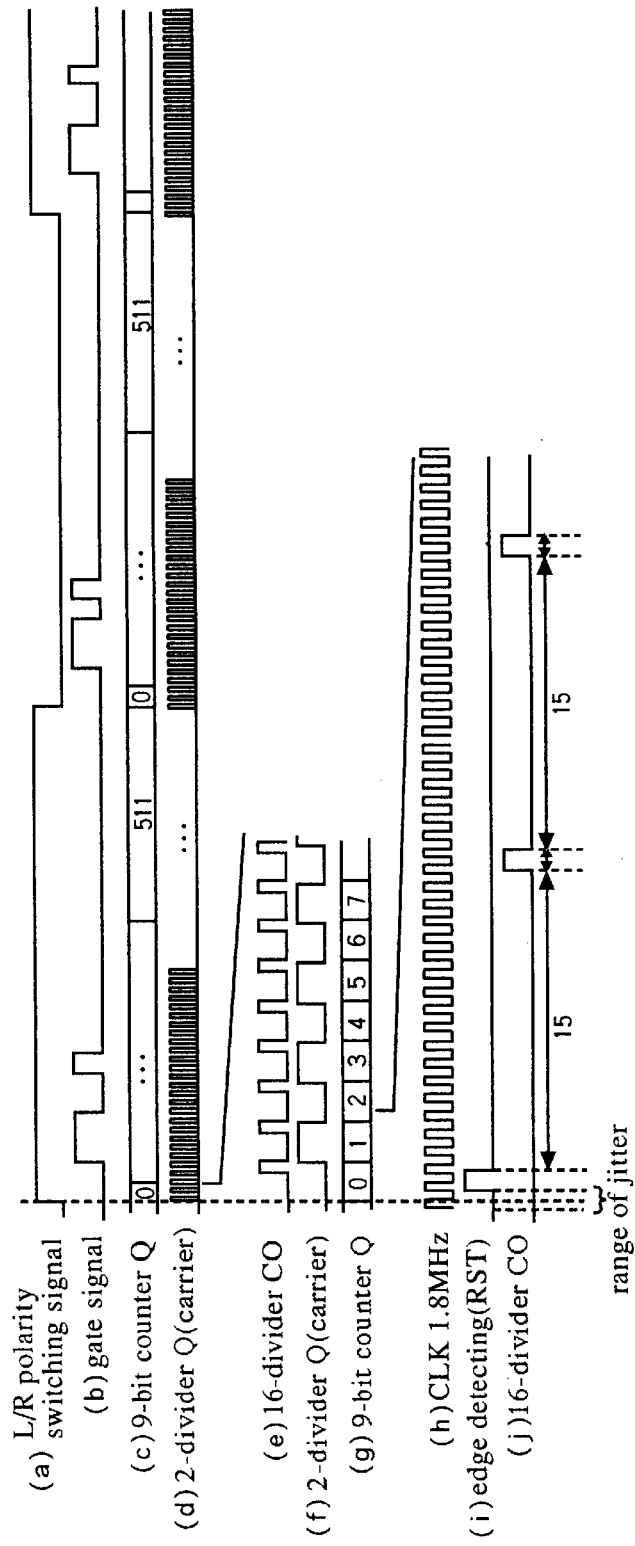
FIG. 2 is a timing chart showing various types of signals in the infrared LED driving pulse generating unit in a frame portion indicated by a dotted line in FIG. 1.

Specifically, as shown in (e), (f), (g) and (i) of FIG. 2, the 9-bit counter 26 counts clocks in such a manner that the counter value is "0" in a period elapsed from the time when it is reset by detecting an edge until the first High pulse in the output corresponding to the value obtained by dividing the clock having a frequency of 1.8 MHz by 16 is outputted, "1" in a period elapsed until the subsequent High pulse is outputted, and "2" in a period elapsed until the subsequent High pulse is outputted. The counting is stopped when the counter value is 511.

The 9-bit counter 26 is reset when a High signal is inputted to its reset (RST) input terminal. The reason why the 9-bit counter 26 is used is that the generation of a gate signal as described later is terminated in a period elapsed until 512 clocks are counted, while the circuit scale is only increased even if not less than 512 clocks are counted and any other advantages do not exist.

A gate signal generating circuit 27 generates a gate signal as shown in (b) of FIG. 2 on the basis of the counter value outputted from the 9-bit counter 26. The gate signal is a signal composed of a relatively long High period, a short High period, and a Low period therebetween. L (a state where a left eye image is displayed) and R (a state where a right eye image is displayed) can be distinguished depending on the length of the Low period. The High period and the Low period are defined by the counter value. A clock signal inputted to the gate signal generating circuit 27 is used for not setting the High period in the gate signal but controlling timing in an internal flip-flop or the like.

An AND element for generating a driving pulse 28 receives the carrier (56 KHz) and the gate signal from the gate signal generating circuit 27, carries out the conjunction therebetween, and generates an infrared LED driving pulse. That is, the carrier is modulated by the gate signal.

The variation in the timing (jitter) at which the gate signal created on the basis of an edge of the L/R polarity switching signal is generated depends on a difference between an edge detected in the edge detecting circuit 23 and the edge of the L/R polarity switching signal. The difference corresponds to one clock having a frequency of 1.8 MHz, as shown in (j) of FIG. 2, so that the jitter is significantly decreased.

When a plurality of persons view an image on a large screen or images on a plurality of image display devices, a plurality of infrared signal transmitting apparatuses may be set. If the range of jitter is large in this case, mutual interference between infrared signals from the plurality of infrared signal transmitting apparatuses easily occurs. Since the jitter in the above-mentioned construction is significantly small, the interference can be reduced.

Figure 3:
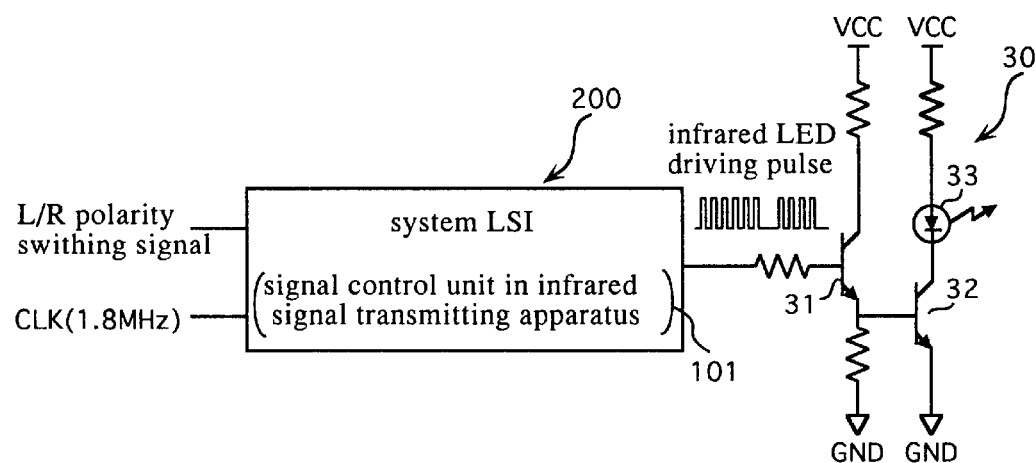
FIG. 3 is a circuit diagram showing an infrared signal transmitting system using a system LSI constructed by including the infrared LED driving pulse generating unit in the frame portion indicated by a dotted line in FIG. 1.

The infrared LED driving pulse generated in the AND element for generating a driving pulse 28 is fed to a light emitting unit 30 comprising transistors 31 and 32 and an infrared LED 33, and so forth, as shown in a circuit diagram of FIG. 3. The infrared LED 33 emits light depending on the infrared LED driving pulse, to output an infrared signal.

Figure 4:
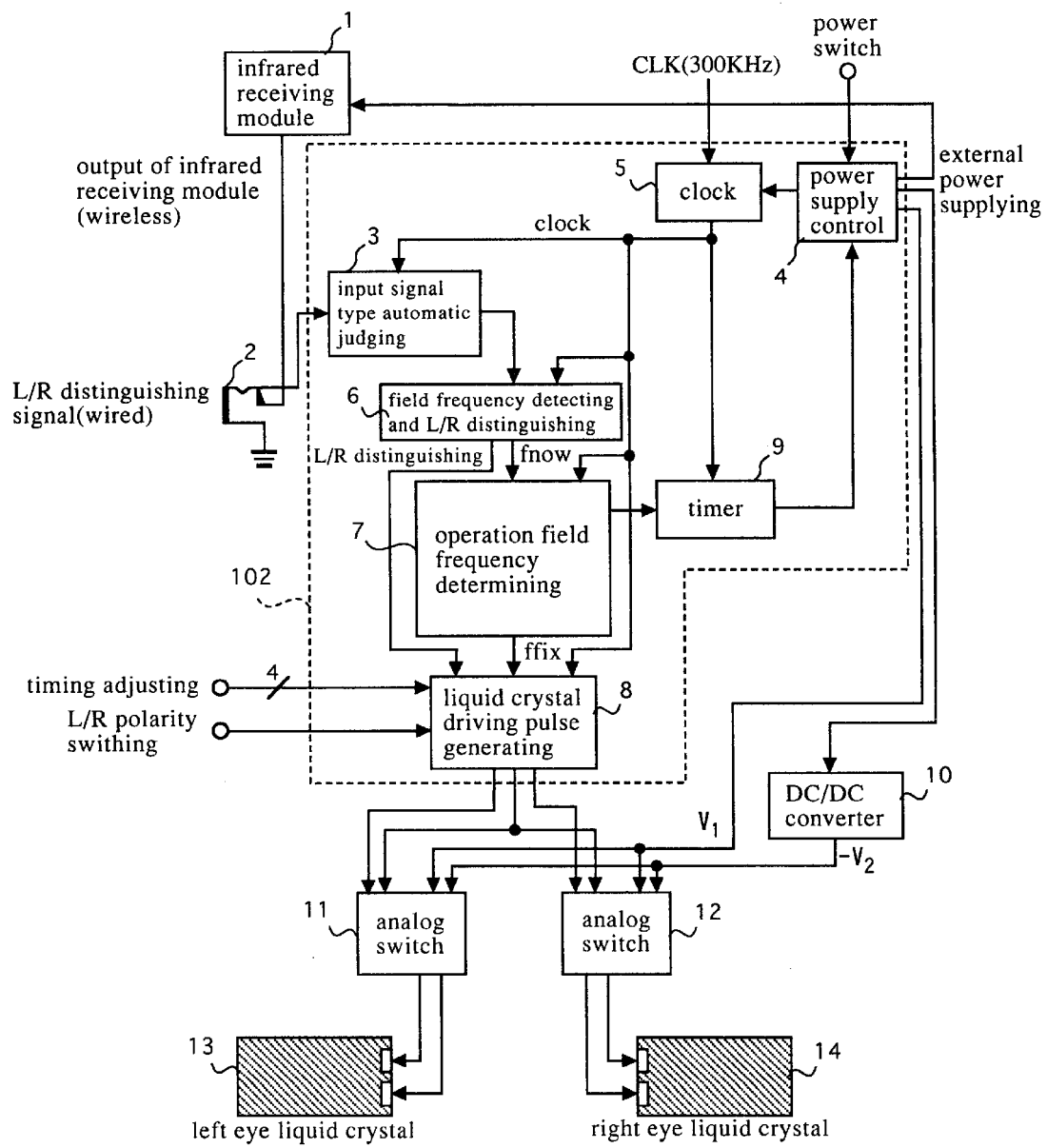
FIG. 4 is a block diagram showing an apparatus for driving liquid crystal shutter glasses.
Figure 5:
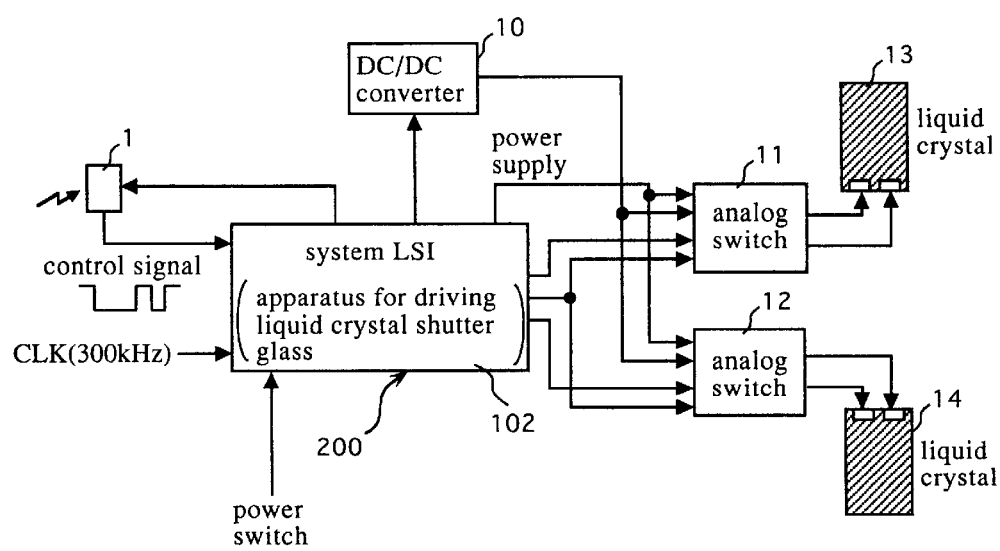
FIG. 5 is a block diagram in a case where a system LSI constructed by including a frame portion indicated by a dotted line in FIG. 4 is used.

Description is now made of an apparatus for driving liquid crystal shutter glasses. FIG. 4 is a block diagram showing the apparatus for driving liquid crystal shutter glasses in an embodiment of the present invention. A portion enclosed by a frame indicated by a dotted line in FIG. 4 is integrated. The portion enclosed by the frame indicated by a dotted line is referred to as an integrated circuit part 102. FIG. 5 is a block diagram in a case where a system LSI 200 constructed, including the integrated circuit part 102, is used.

An infrared receiving module 1 receives the infrared signal outputted from the light emitting unit 30. In order to make it possible to select "wireless" (in a case where the infrared signal is used) and "wired", the infrared receiving module 1 is provided with a jack 2 for directly accepting an L/R distinguishing signal (corresponding to the L/R polarity switching signal).

An input signal type automatic judging unit 3 judges the type of an input signal. For example, it is judged whether an input signal which is the infrared signal is a signal in which a High period and a Low period are simply repeated, a signal which is coded in correspondence with L and H, or a signal having a carrier further added to the coded signal.

A field frequency detecting and L/R distinguishing unit 6 performs processing for detecting a field frequency and distinguishing an L signal and an R signal from the received infrared signal or L/R distinguishing signal. In the distinction, if the infrared signal is received, a signal corresponding to the above-mentioned gate signal is obtained by processing for demodulating the infrared signal, so that it is possible to distinguish L (a state where a left eye image is displayed) and R (a state where a right eye image is displayed) depending on the length of a Low period between a relatively long High period and a short High period. In the "wired", the distinction between L and R can be immediately made from the L/R distinguishing signal. The field frequency is represented by the number of counted clocks (the number of times of counting) in an L/R signal period (a period during which High and Low are switched).

An operation field frequency determining unit 7 performs processing for checking, determining and holding a frequency (timing) in an alternate shutter operation of a left eye liquid crystal 13 and a right eye liquid crystal 14. That is, the number of clocks counted in a High period or a Low period of the previous L/R signal (the old field frequency) and the number of clocks counted in a Low period or a High period of the current L/R signal (the new field frequency) are compared, to check the variation and the stability of the frequency.

The determination is made when a stable state is continued. When an unstable state occurs, the shutter operation is continued (self-contained) at the held timing. Its object is to maintain the alternate shutter operation of the left eye liquid crystal 13 and the right eye liquid crystal 14 by the field frequency which is held for some time even when the receiving of the infrared signal is interrupted from any cause. The outline of such processing is indicated by a state 3, a state 4, and a state 5 in a state transition diagram of FIG. 8. Specific processing in each of the states will be described in detail later using flow charts shown in FIGS. 9 to 11.

A liquid crystal driving pulse generating unit 8 carries out ① control for generating three types of voltages (VLCD: a liquid crystal does not transmit light, 0 volt: a liquid crystal transmits light, –VLCD: a liquid crystal does not transmit light) by analog switches 11 and 12 at the determined field frequency, ② control for adjusting the timing of supply of zero volt (a liquid crystal transmits light) by the analog switches 11 and 12 using a timing adjusting signal, and ③ control for switching between L/R polarities.

[Control of ①]

The analog switches 11 and 12 are supplied with a voltage (V1) from a power supply control unit 4 and a voltage (–V2) from a DC/DC converter 10, and respectively supply to the liquid crystals 13 and 14 VLCD (=V1+V2) (close: a state where light is not transmitted), 0 volt (open: a state where light is transmitted), –VLCD (=–(V1+V2)) (close: a state where light is not transmitted), 0 volt (open: a state where light is transmitted), and VLCD (close: a state where light is not transmitted) in this order. Which of the three types of voltages should be generated can be determined by a 2-bit control signal. Therefore, the control signal may be fed to each of the analog switches 11 and 12.

The liquid crystal driving pulse generating unit 8 comprises three-bit output terminals, and carries out such control that one of the output terminals is shared between the two analog switches 11 and 12, and each of other two out put terminals are connected to the two analog switch respectively. Therefore 2-bit control signals are respectively fed to the two analog switches 11 and 12 from the liquid crystal driving pulse generating unit 8. It is possible to judge by the L/R distinguishing signal from the field frequency detecting and L/R distinguishing unit 6 which of the liquid crystals should be opened (the other liquid crystal being closed). The timing at which the 2-bit control signal is fed is judged by the number of counted clocks which is the field frequency determined by the operation field frequency determining unit 7. That is, the counting of clocks is started from the time point where the field frequency is determined (see a pulse counter 8b in FIG. 6), and the 2-bit control signal is generated in a pulse generating unit 8a (see FIG. 6) at the time point where the number of counted clocks in the counting coincides with the number of counted clocks which is the field frequency as a general rule.

[Control of ②]

Figure 7:
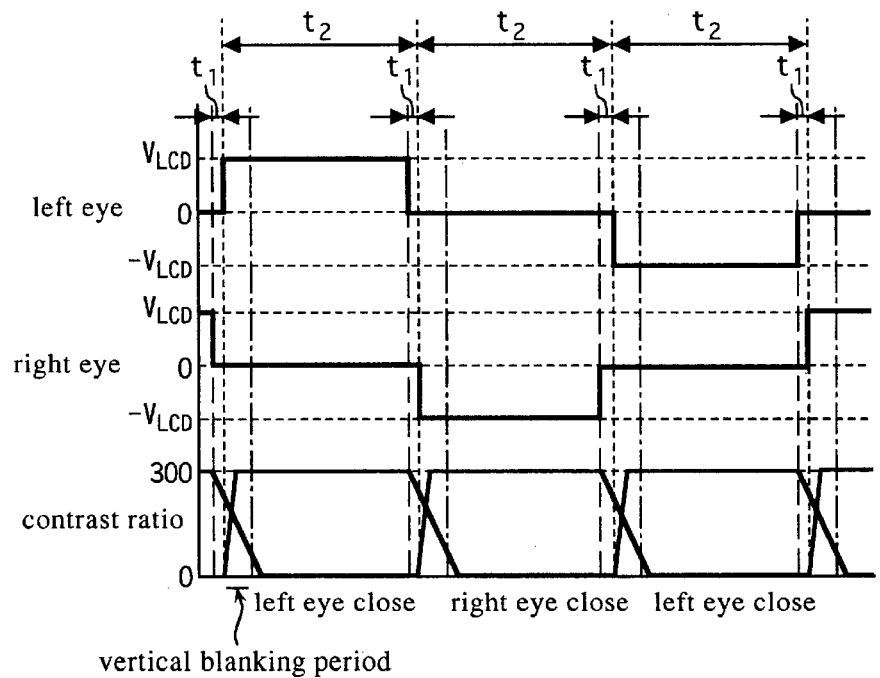
FIG. 7 is a timing chart showing the timing at which a voltage of zero volt is applied to liquid crystal shutter glasses.

The control of ② is control for adjusting a period t1 in FIG. 7. That is, control for advancing the timing of the 2-bit control signal fed to each of the analog switches 11 and 12 by t1 not at the timing of the above-mentioned determined field frequency but on the basis of the timing adjusting signal is performed.

Specifically, the timing of starting a period t2 in FIG. 7 is defined at the above-mentioned determined field frequency, to advance the time when each of the liquid crystals 13 and 14 is opened by t1 while coping with vertical synchronization so that the contrast ratio is approximately zero at the time point where vertical blanking is terminated. Consequently, it is possible to prevent the upper part of the screen in the 3D display from looking dark. Since the timing adjusting signal is composed of four bits in the present embodiment, such control can be carried out by being adjusted in 16 stages. How long the time when each of the liquid crystals is opened is advanced differs depending on the open response characteristics of the liquid crystal used.

[Control of ③)]

There are a case where a High signal means "L" and a Low signal means "R" and a case where a High signal means "R" and a Low signal means "L" depending on the type of 3D display. In order to cope therewith, the control of ③ is control for reversing the recognition of L and the recognition of R on the side of the liquid crystal shutter glasses.

The power supply control unit 4 is supplied with power from a power supplying unit outside the integrated circuit part 102, and supplies power to each circuit inside of the integrated circuit part 102 and also supplies power to the DC/DC converter 10, etc. outside thereof when a power switch is turned on.

The clock control circuit 5 controls a clock having a frequency of 300 KHz from a clock generating unit (not shown), and supplies a predetermined clock to each circuit in the integrated circuit part 102. The clock control circuit 5 may comprise an RC oscillator, to generate a clock from itself (see FIG. 6).

A timer 9 starts counting from the time when the operation field frequency determining unit 7 changes a state where the field frequency is indefinite, to issue a power stop command to the power control unit 4 when this state is continued for approximately two minutes.

Figure 6:
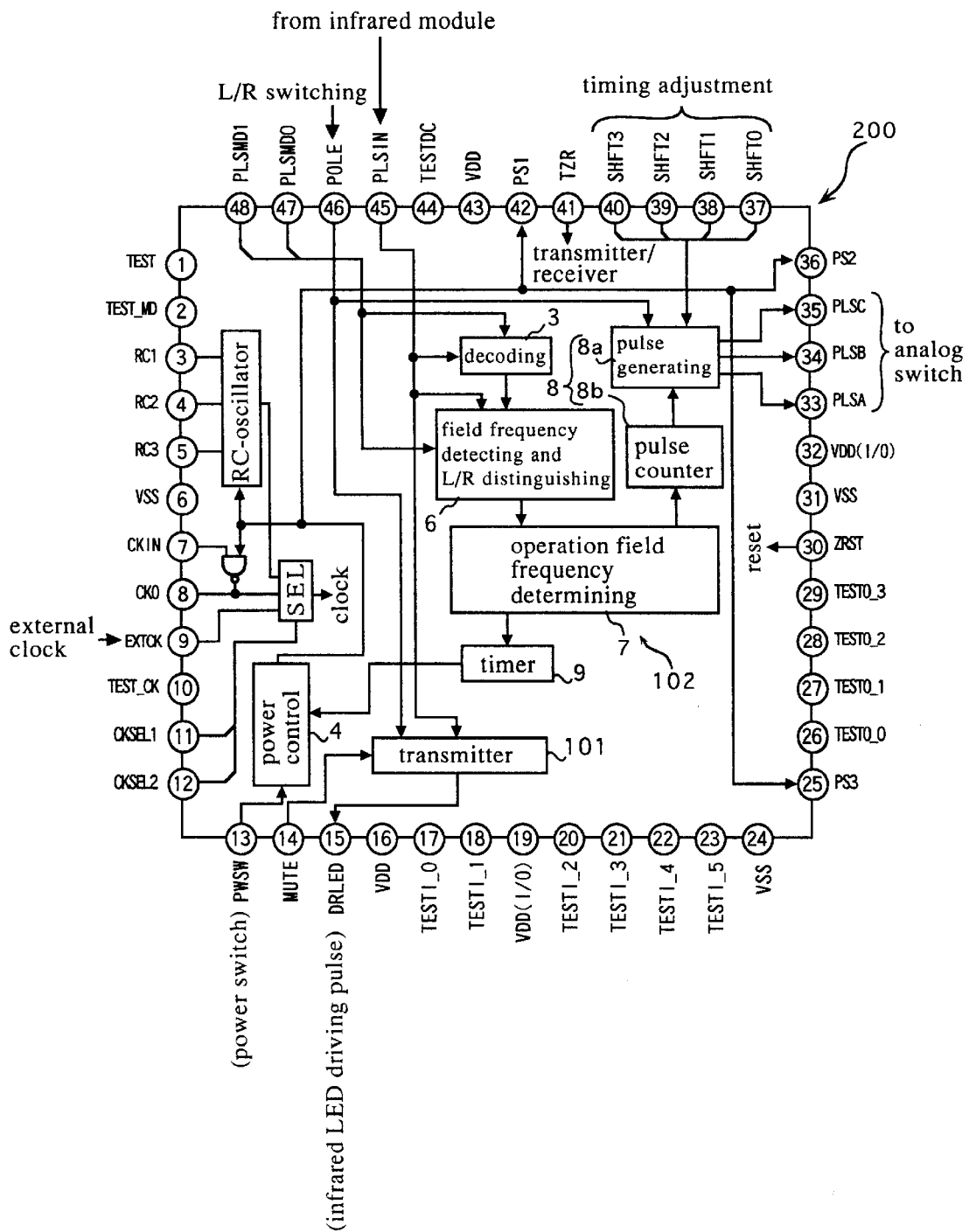
FIG. 6 is an explanatory view showing a system LSI constructed by including a circuit portion shown in FIG. 1 and the frame portion indicated by a dotted line in FIG. 4.

FIG. 6 is an explanatory view schematically showing the internal construction of a system LSI 200, the arrangement of pins, and the like. The system LSI 200 is constructed by making the above-mentioned infrared LED driving pulse generating unit 101 and the integrated circuit part 102 into one chip. Consequently, the system LSI 200 can be used for constructing an infrared signal transmitting apparatus, and can be also used for constructing an apparatus for driving liquid crystal shutter glasses (an infrared signal receiving apparatus). Accordingly, the system LSI 200 can be mass-produced as an LSI which can be shared between a 3D display and liquid crystal shutter glasses, thereby making it possible to cut costs.

Figure 8:
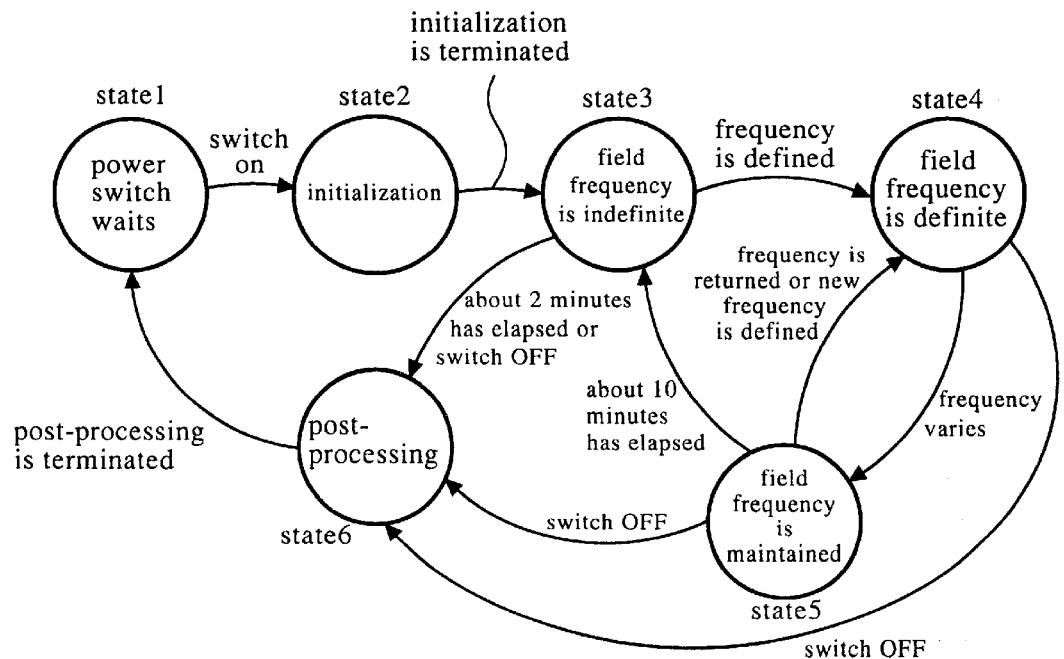
FIG. 8 is a state transition diagram in the apparatus for driving liquid crystal shutter glasses according to the present invention.
Figure 9:
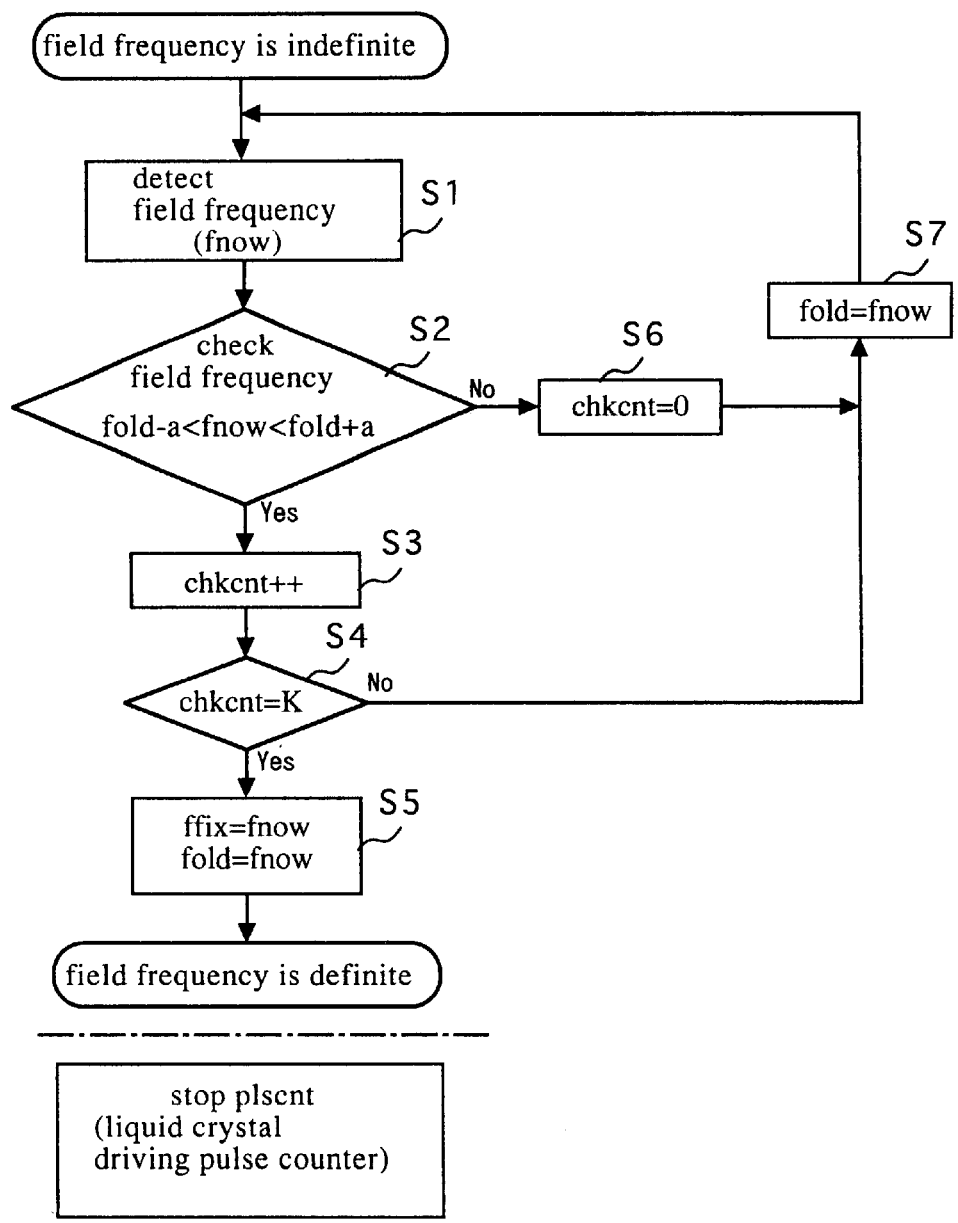
FIG. 9 is a flow chart showing the contents of control in a state where the field frequency is indefinite in the present invention.
Figure 10:
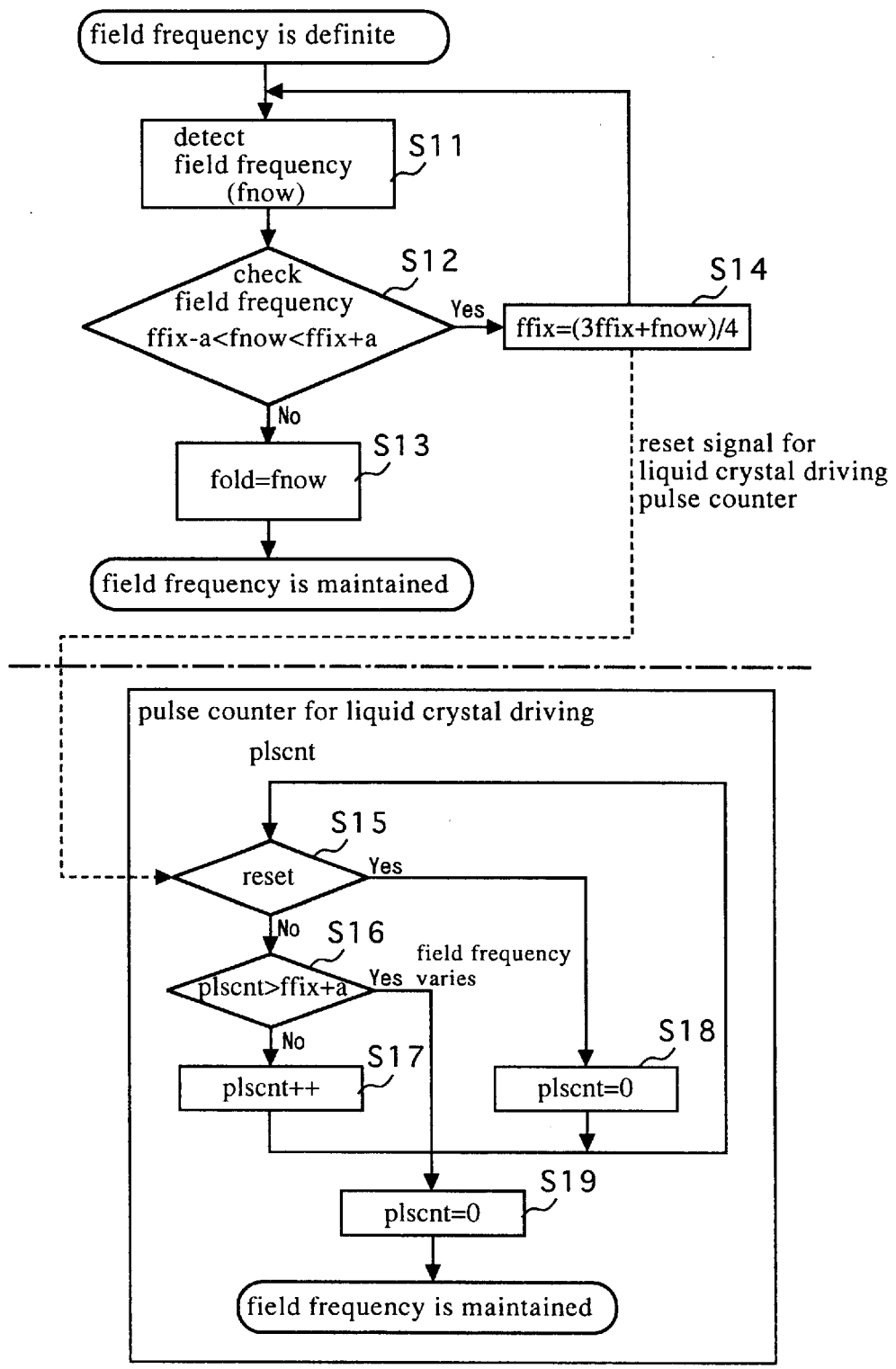
FIG. 10 is a flow chart showing the contents of control in a state where the field frequency is definite in the present invention.
Figure 11:
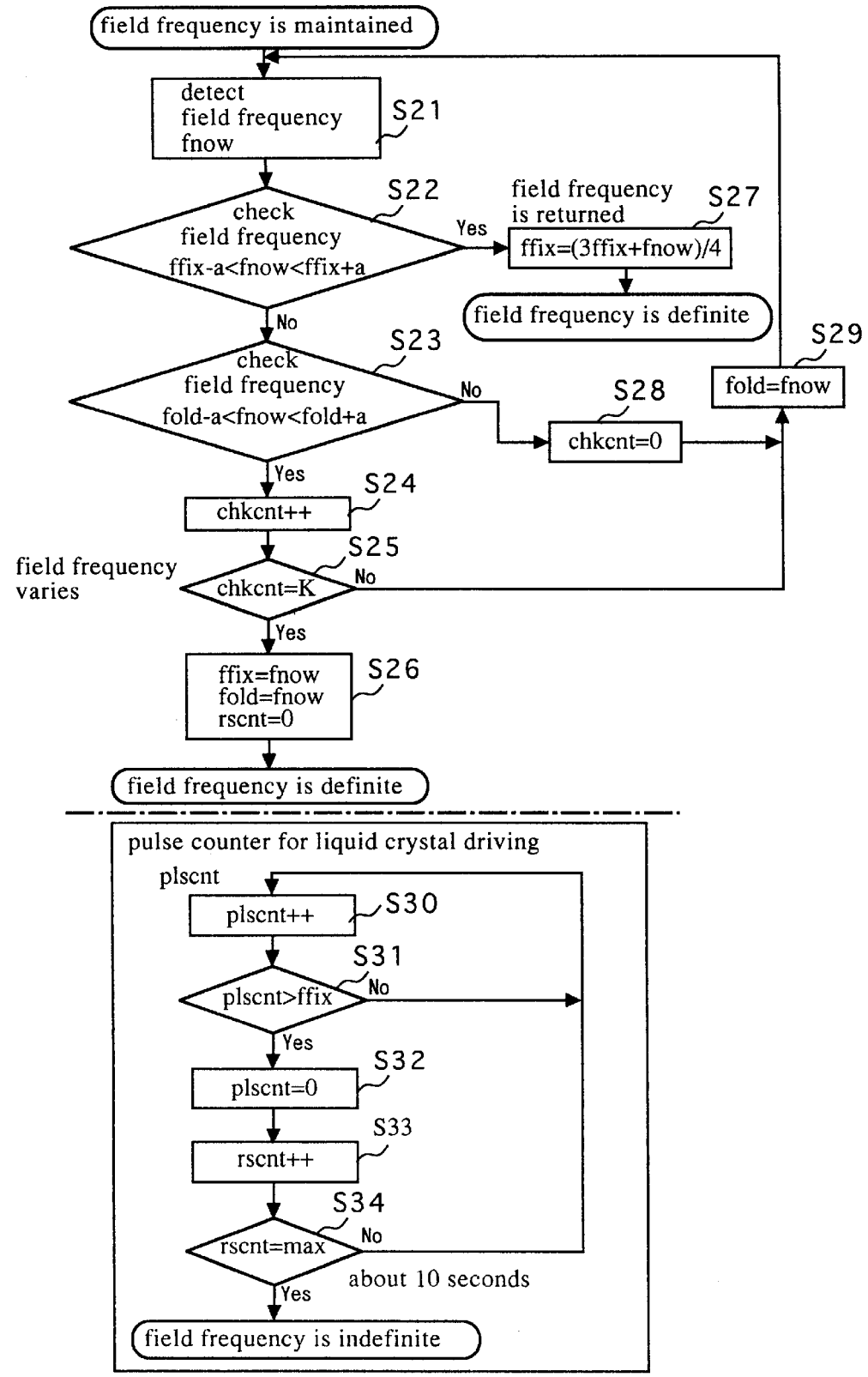
FIG. 11 is a flow chart showing the contents of control in a state where the field frequency is maintained in the present invention.

FIG. 8 is a state transition diagram for explaining the transition of a state where the apparatus for driving liquid crystal shutter glasses is operated. The specific contents of processing in the states 3, 4, and 5 in the state transition diagram, that is, the contents of processing in the operation field frequency determining unit 7 will be described on the basis of FIGS. 9 to 11. FIGS. 9, 10, and 11 respectively illustrate processing in the state where the field frequency is indefinite (the state 3), processing in the state where the field frequency is definite (the state 4), and processing in the state where the field frequency is maintained (the step 5).

In FIG. 9, the field frequency is first detected, and the detected field frequency (the number of counted clocks) is taken as fnow (step 1). Processing for checking the field frequency is then performed (step 2). That is, it is judged whether or not the field frequency fnow currently detected is within a predetermined range (−a to a) on the basis of the field frequency fold previously detected.

If the field frequency is not within the range, a check counter (chkcnt) is set to zero (cleared), and the field frequency fnow currently detected is taken as fold, after which the program is returned to the step 1. On the other hand, when the field frequency is within the range, the check counter (chkcnt) is incremented (step 3).

The counter value of the check counter (chkcnt) is then judged (step 4). When the counter value becomes a predetermined value K (K is set arbitrarily, for example, in a range of 10 to 60), the field frequency fnow currently detected is taken as ffix and fold, assuming that the frequency is stabilized (step 5), after which processing in the state where the field frequency is definite is started. In the state where the field frequency is indefinite (state 3), the pulse counter 8b (see FIG. 6) in a liquid crystal driving pulse generating unit 8 stops its counting operation. That is, the shutter operation is stopped in the liquid crystal shutter glasses (the shutter operation has not been started yet in the case of the transition from the state 2).

In FIG. 10, the field frequency is first detected, and the detected field frequency (the number of counted clocks) is taken as fnow (step 11). It is then judged whether or not the field frequency fnow currently detected is within a predetermined range (−a to a) on the basis of the determined field frequency ffix (step 12). When the answer is in the affirmative in this check, the current field frequency fnow is slightly reflected, to newly generate ffix (step 14), after which the program is returned to the step 11. On the other hand, when the answer is in the negative, the field frequency fnow currently detected is taken as fold (step 13), after which processing in the state where the field frequency is maintained is started.

When the program proceeds to the step 14, a reset signal for the pulse counter 8b in the liquid crystal driving pulse generating unit 8 is outputted, so that it is judged that the answer is in the affirmative in judgment processing at the step 15, and the counter value is then cleared (step 18), after which the program proceeds to the step 15. When the answer is in the negative at the step 15, it is judged whether or not the counter value is larger than ffix+a (step 16). If the counter value is larger, the counter value is cleared (step 19), after which processing in the state where the counter value is maintained is started. When it is judged at the step 16 that the counter value is smaller, the counter value is incremented, after which the program proceeds to the step 15.

The meaning of the above-mentioned processing in the pulse counter 8b in the liquid crystal driving pulse generating unit 8 will be briefly described. In the liquid crystal driving pulse generating unit 8, when clocks whose number corresponds to ffix are counted, a shutter operation of the liquid crystals is switched. Since the subsequent ffix is not determined at the step 14 (which also occurs even in a case where an infrared signal is blocked from any cause), however, the counting operation of the pulse counter 8b is not reset. When the counter value exceeds ffix+a, the processing in the state where the field frequency is maintained is started in order that the shutter operation of the liquid crystals is continued (self-contained) using the ffix.

In FIG. 11, the field frequency is first detected, and the detected field frequency (the counter value) is taken as fnow (step 21). If the state where the infrared signal is blocked is continued, the field frequency cannot be detected in this period. When the field frequency is detected, the field frequency (the number of counted clocks) significantly differs from the previous value.

First check processing of the field frequency is then performed in the same method as that at the step 12 shown in FIG. 10 (step 22). When the answer is in the affirmative in the check, the current field frequency fnow is slightly reflected, to newly generate ffix (step 27), after which processing in the state where the field frequency is definite is started. On the other hand, when the answer is in the negative, second check processing of the field frequency is performed in the same method as that at the step 2 shown in FIG. 9 (step 23). When the answer is in the negative in the check, the counter value of the check counter (chkcnt) is cleared (step 28), and the field frequency fnow currently detected is taken as fold, after which the program proceeds to the step 21.

When the answer is in the affirmative at the step 23, the counter value of the check counter (chkcnt) is incremented (step 24). The counter value of the check counter (chkcnt) is judged (step 25). When the counter value becomes a predetermined value K, the field frequency fnow currently detected is taken as ffix and fold, assuming that the frequency is stabilized. Further, the counter value of a reset counter (rscnt) is cleared (step 26), after which the processing in the state where the field frequency is definite is started. If the counter value is not a predetermined value K at the step 25, the program proceeds to the step 29. The reset counter (rscnt) determines how long the shutter operation of the liquid crystals is continued (self-contained).

In the state where the field frequency is maintained, the pulse counter 8b in the liquid crystal driving pulse generating unit 8 continues to perform its counting operation (step 30), and judges whether or not the counter value is ffix (ffix has been set at the steps 13 and 14), that is, whether or not the switching timing of the shutter operation of the liquid crystals has arrived (step 31). If the answer is in the affirmative at the step 31, the counter value of the pulse counter 8b is reset in order to judge the next arrival of the subsequent timing of the shutter operation (step 32). The reset counter (rscnt) is incremented (step 33).

The reset counter (rscnt) determines a time period during which the shutter operation of the liquid crystals is continued (self-contained), as described above, and judges whether or not the time period exceeds its maximum allowable value (MAX: corresponding to approximately 10 seconds) (step 34). When it exceeds the maximum allowable value, the processing in the state where the field frequency is indefinite is started, to stop the shutter operation of the liquid crystals in the liquid crystal shutter glasses. While it does not exceed the maximum allowable value, the shutter operation of the liquid crystals is continued (self-contained). If the field frequency is stabilized in this period, the processing in the state where the field frequency is definite is started.

(Embodiment 2)

There is a 3D display so adapted as to switch between a 3D display mode in which a right eye image and a left eye image are alternately displayed on a screen in a predetermined period and a normal 2D display mode. In the 3D display capable of this type of switching, an infrared signal representing shutter timing in liquid crystal shutter glasses is not sent out in the 2D display mode.

Therefore, it cannot be judged whether the infrared signal cannot be received on the side of the liquid crystal shutter glasses due to the block or the 2D display mode. When the 3D display mode is switched to the 2D display mode with the liquid crystal shutter glasses mounted, therefore, a screen flickers by continuation (self-containment) of a shutter operation in the liquid crystal shutter glasses.

An apparatus for driving liquid crystal shutter glasses according to the present embodiment 2 is constructed as follows in order to prevent the screen from flickering.

Figure 12:
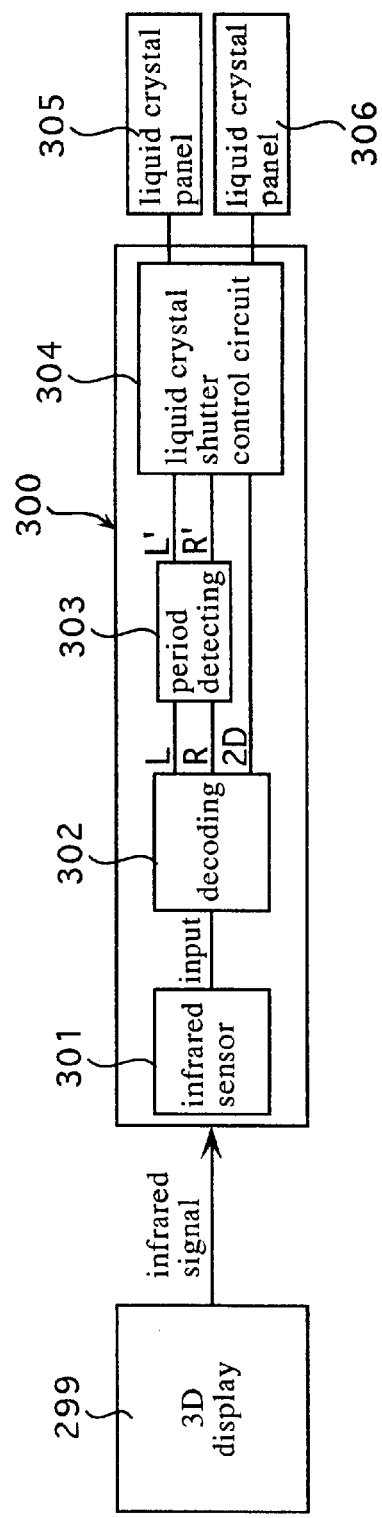
FIG. 12 is a block diagram showing an apparatus for driving liquid crystal shutter glasses according to an embodiment 2 of the present invention.

FIG. 12 is a diagram showing the schematic construction of an apparatus for driving liquid crystal shutter glasses 300 according to the embodiment 2. The driving apparatus 300 comprises an infrared sensor 301 for receiving an infrared signal from a 3D display 299, a decoding unit 302 for extracting L and R signals (an L pulse and an R pulse) from the received infrared signal and distinguishing a 3D display mode and a 2D display mode, a period detecting unit 303, and a liquid crystal shutter control circuit 304, and outputs L' and R' signals (an L' pulse and an R' pulse) which are decision signals in order to control a shutter operation of liquid crystal panels 305 and 306 in the liquid crystal shutter glasses.

The decoding unit 302 performs an operation corresponding to the input signal type automatic judging unit 3 in the embodiment 1, the period detecting unit 303 performs operations corresponding to the field frequency detecting and L/R distinguishing unit 6 and the operation field frequency determining unit 7, the liquid crystal shutter control circuit 304 performs operations corresponding to the liquid crystal driving pulse generating unit 8 and the analog switches 11 and 12 and carries out such control as to stop the shutter operation of the liquid crystal panels 305 and 306 when a signal representing a 2D display mode is obtained from the decoding unit 302.

Figure 13:
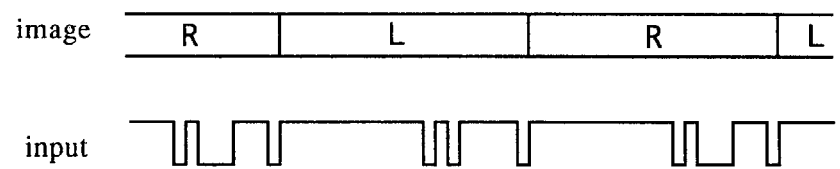
FIG. 13 is an explanatory view showing the relation between switching between a state where a right eye image is displayed and a state where a left eye image is displayed and input (a right eye image/left eye image distinguishing signal) corresponding thereto.
Figure 14:
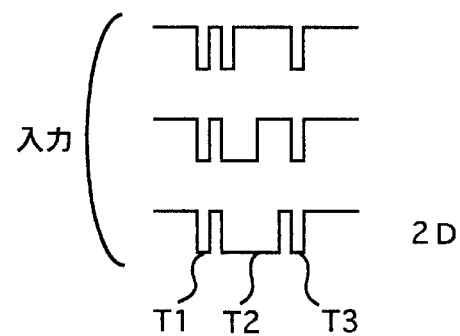
FIG. 14 is an explanatory view showing the right eye/left eye distinguishing signal and a judging signal meaning a 2D mode in the construction shown in FIG. 12.

FIG. 13 is a diagram showing the relationship between a state where left eye/right eye images are displayed upon being switched (L/R) and an infrared signal, which corresponds to the relationship between (a) and (b) of FIG. 2 in the embodiment 1. In the embodiment 2, the meaning of the signal is determined by a first Low period T1, a second Low period T2 and a third Low period T3, as shown in FIG. 14. A signal satisfying T2<(T1+T3) represents L, a signal satisfying T2=(T1+T3) represents R, and a signal satisfying T2>(T1+T3) represents 2D. The 3D display 299 sends out an infrared signal satisfying T2>(T1+T3) when display in a 2D mode is performed.

Figure 15:
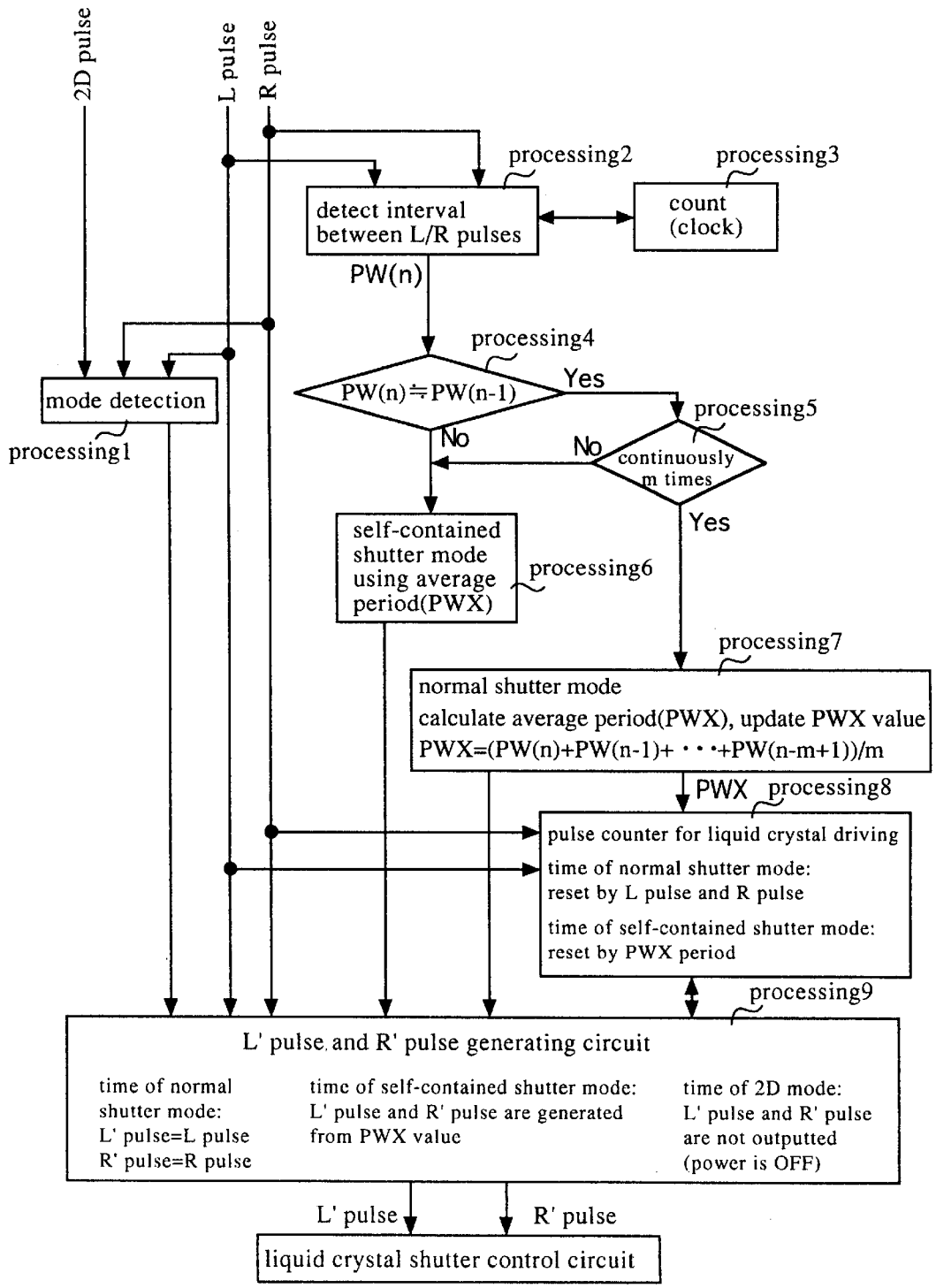
FIG. 15 is an explanatory view showing the contents of control in the construction shown in FIG. 12.
Figure 16:
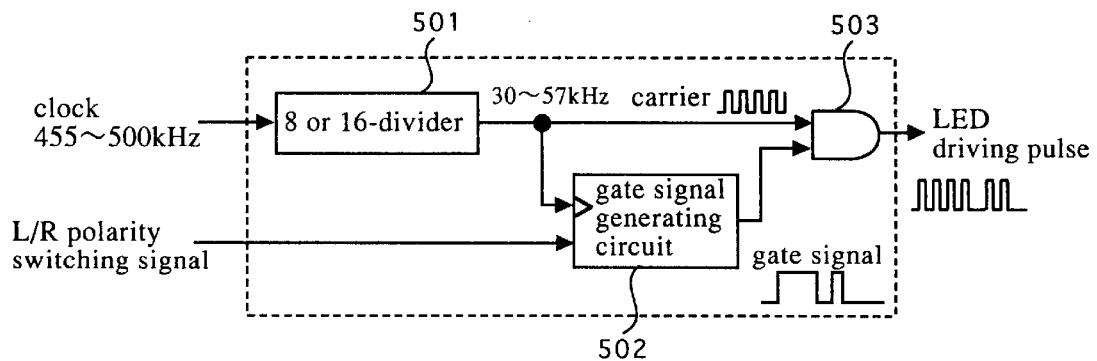
FIG. 16 is a block diagram showing a spatial transmission signal transmitting apparatus for liquid crystal shutter glasses so constructed that the range of jitter is relatively large.
Figure 17:
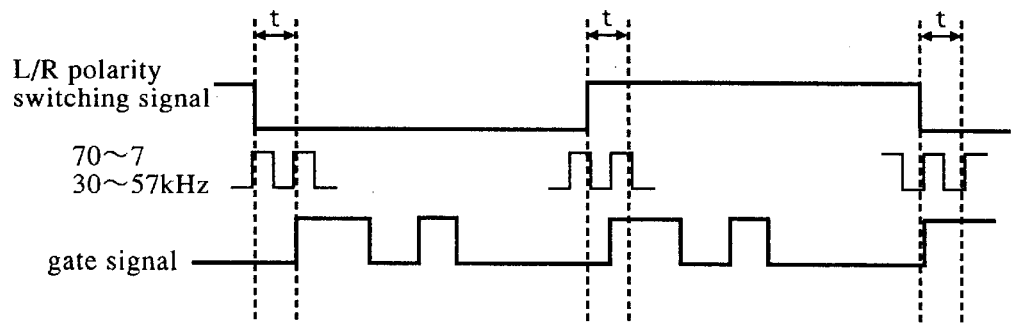
FIG. 17 is an explanatory view showing the range of jitter in the construction shown in FIG. 16.
Figure 18:
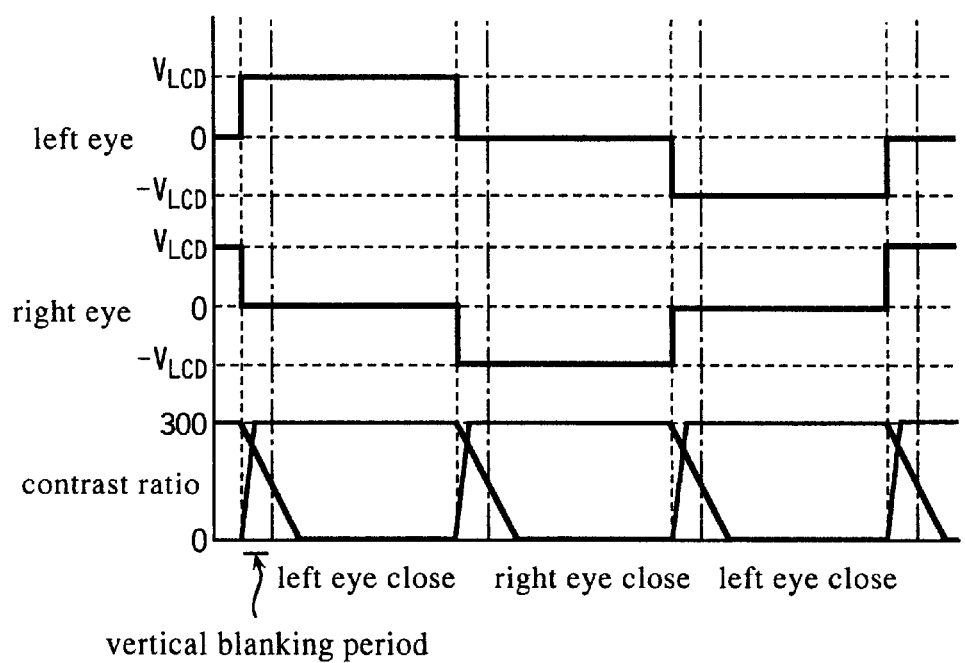
FIG. 18 is an explanatory view for explaining that the upper part of a screen looks dark when conventional liquid crystal shutter glasses are used.

FIG. 15 is an explanatory view briefly showing the contents of control in the embodiment 2. In processing 1, mode detection is performed. If the L and R signals are detected in the mode detection, a judging signal meaning a 3D mode is outputted. Thereafter, if a 2D signal is detected, a judging signal meaning a 2D mode is outputted. If the L and R signals are detected at the time of a 2D mode, a judging signal meaning a 3D mode is outputted. In processing 2, an interval between the L and R pulses PW(n) is detected. The detection is performed by the number of counted clocks (the number of times of counting) (processing 3) during the pulse interval. In processing 4, it is judged whether or not the difference between the current pulse interval PW(n) and the previous pulse interval PW(n−1) is in a predetermined allowable range. If an allowed state continuously occurs m or more times (processing 5), the transition to a normal shutter mode occurs. The sum of m pulse intervals including the current pulse interval PW(n), that is, PW(n)+PW(n−1)+ . . . +PW(n−m+1), is divided by m, to calculate an average value (PWX) and update the average value (processing 7).

When the answer is in the negative in the processing 4 and the answer is in the negative in the processing 5, the transition to a self-contained shutter mode using the average value (PWX) occurs. A pulse counter for liquid crystal driving is reset by the L pulse and the R pulse at the time of a normal shutter mode (corresponding to the step 18 shown in FIG. 10 in the embodiment 1), while being reset by the average value (PWX) at the time of the self-contained shutter mode (corresponding to the steps 31 and 32 shown in FIG. 11 in the embodiment 1), as described in processing 8. As described in the processing 9, predetermined pulse output processing for driving a liquid crystals or pulse output stopping (power OFF) processing is performed at each of the time of the normal shutter mode, the time of the self-contained shutter mode, and the time of the 2D mode.

According to the construction in the embodiment 2, when the 3D display mode is switched to the 2D display mode, therefore, continuation (self-containment) of the shutter operation in the liquid crystal shutter glasses is stopped, thereby preventing the screen from flickering.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An apparatus for driving liquid crystal shutter glasses, comprising:

receiving means for receiving a spatial transmission signal generated on the basis of a signal representing switching between right and left eye images;

means for acquiring data relating to shutter timing in the liquid crystal shutter glasses from the received spatial transmission signal;

means for generating decision data relating to shutter timing to be fed to the liquid crystal shutter glasses on the basis of predetermined conditions from the data relating to shutter timing newly obtained in succession and holding the generated decision data; and means capable of causing, when no decision data is generated because said predetermined conditions are not satisfied, the liquid crystal shutter glasses to perform a shutter operation using said held decision data, wherein predetermined processing is executed, respectively, in a state where the field frequency is indefinite, a state where the field frequency is definite, and a state where the field frequency is maintained, and the transition from each of the three states to the other states occurs depending on the result of the execution, said state where the field frequency is indefinite is a state where the shutter operation is stopped, in which processing for judging whether or not the predetermined conditions are satisfied and generating said decision data when the conditions are satisfied is performed, said state where the field frequency is definite is a state where the shutter operation is performed on the basis of the decision data successively determined, in which the decision data is generated and held when the predetermined conditions are satisfied, while the transition to said state where the field frequency is maintained occurs when the predetermined conditions are not satisfied, and said state where field frequency is maintained is a state where the shutter operation is continued on the basis of the held decision data, in which the transition to the state where the field frequency is definite occurs when the predetermined conditions are satisfied, while the transition to the state where the field frequency is indefinite occurs when the shutter operation is continued for a predetermined time period without satisfying the predetermined conditions.

2. The apparatus for driving liquid crystal shutter glasses according to claim 1, wherein said receiving means is so constructed as to also receive a spatial transmission signal representing a two-dimensional display mode, and so constructed that the supply of power to the liquid crystal shutter glasses is stopped when it receives said spatial transmission signal representing a two-dimensional display mode.

* * * * *